Dec. 1, 1925.
J. F. WILMOT
VEHICLE WHEEL
Filed April 11, 1923
1,563,679
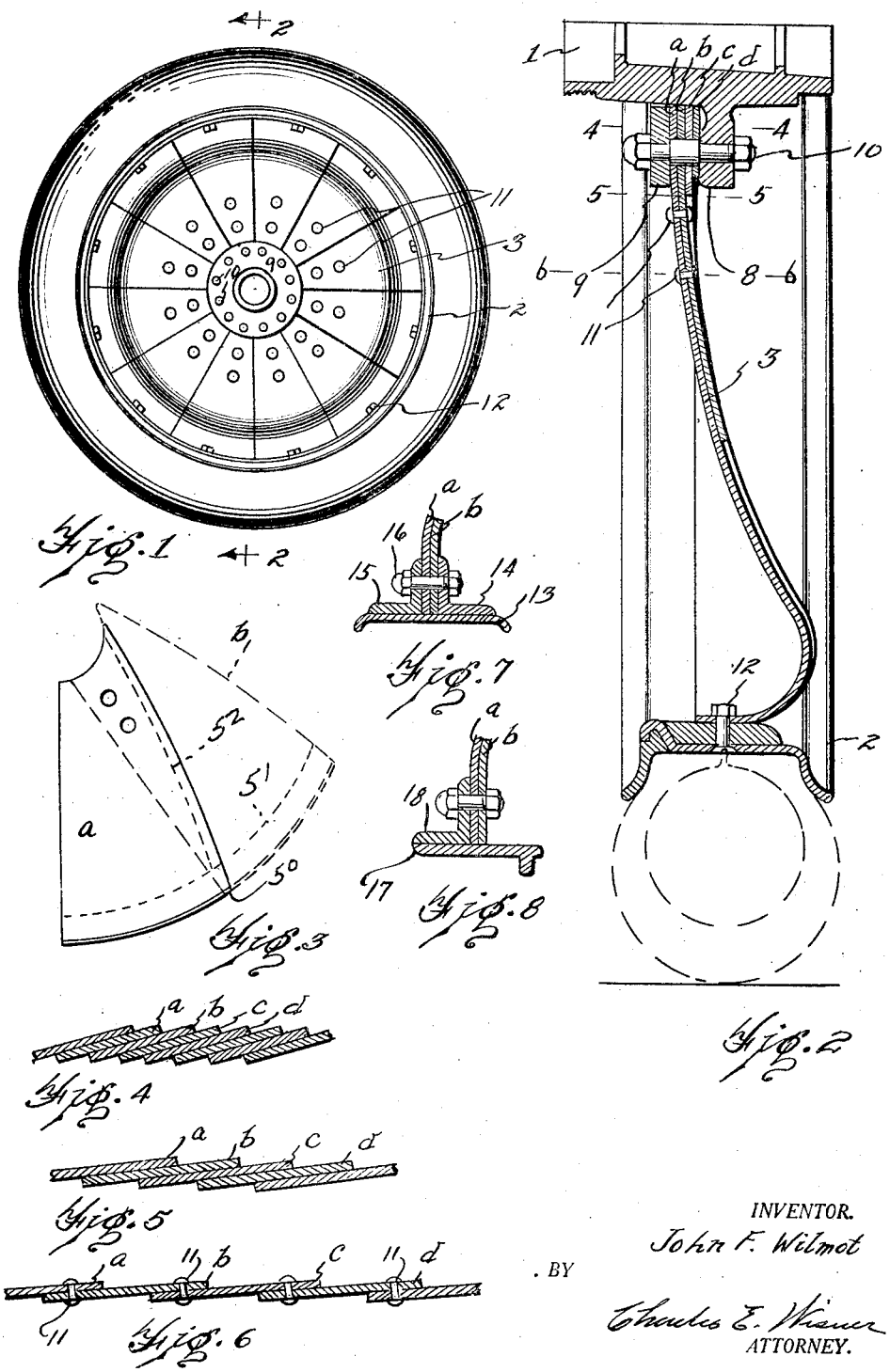
INVENTOR.
John F. Wilmot
BY
Charles E. Wisner
ATTORNEY.

Patented Dec. 1, 1925.

1,563,679

UNITED STATES PATENT OFFICE.

JOHN F. WILMOT, OF DETROIT, MICHIGAN.

VEHICLE WHEEL.

Application filed April 11, 1923. Serial No. 631,304.

*To all whom it may concern:*

Be it known that I, JOHN F. WILMOT, a citizen of the United States, residing at Detroit, county of Wayne, State of Michigan, have invented a certain new and useful Improvement in Vehicle Wheels, and declare the following to be a full, clear, and exact description of the same, such as will enable others skilled in the art to which it pertains to make and use the same, reference being had to the accompanying drawings, which form a part of this specification.

This invention relates to vehicle wheels, and the object is to provide a substantial and resilient disk wheel adaptable for various uses as for instance a road wheel for an automotive vehicle or a car wheel and similar wheels for various classes of vehicles for transportation. The particular feature of the invention is in the construction of the disk, the object being to provide a disk that is of great strength at the center or point of connection with the hub where the greatest strain occurs and of less strength and greater flexibility toward the rim or tire. Such arrangement has been attempted to be secured in the past by forming a single disk of tapered section and sometimes of several disks of different diameters. In such previous arrangements, however, the structure is expensive both as to labor cost and as to cost of material. An object of this invention is to form a composite disk consisting of a plurality of small plates or sectors overlapping in a manner to form several plies or layers at the hub or center and being each attached to the rim, the extent of "overlap" decreasing toward the rim at which point the plates are in practically edge to edge relationship. These objects and the several novel features of the invention and the benefits to be obtained therefrom are hereinafter more fully described and claimed, and the preferred form of construction of a wheel embodying my invention is shown in the accompanying drawings in which—

Fig. 1 is a side elevation of an automotive vehicle wheel.

Fig. 2 is a half section on an enlarged scale taken on line 2—2 of Fig. 1.

Fig. 3 is a detail showing the preferred method of overlapping the plates at the center.

Fig. 4 is a section taken on line 4—4 of Fig. 2.

Fig. 5 is a section taken on line 5—5 of Fig. 2.

Fig. 6 is a section taken on line 6—6 of Fig. 2.

Fig. 7 is a section of a different type of rim to that shown in Fig. 2.

Fig. 8 is a section of another type of rim.

The disk is adaptable for use in the manufacture of various types of wheels as for instance the usual automotive vehicle wheel having a solid or pneumatic tire or car wheel or similar structure. The use of the disk in the manufacture of a vehicle road wheel is shown more particularly in Figs. 1, 2 and 7. In Fig. 2 the hub (which may be of any approved type) is indicated at 1 and the rim is shown at 2, it being of the common type having a removable flange, but it is to be understood that any type of rim may be utilized with my improved disk which is shown generally at 3 extending from the hub to the rim. This disk is here shown supported between the fixed flange 8 and the loose flange 9 of the hub by bolts 10 passing through the flanges and the assembled sectors $a$, $b$, $c$ and $d$ etc., of the disk.

The disk is made up of a multiplicity of sectors indicated in Fig. 3 by full lines $a$. A second similar disk is shown in Fig. 3 by dotted lines $b$ which is to be understood as being placed over the member $a$ and riveted or otherwise secured thereto. The disk is formed of successive plates or sectors placed one over the other preferably in the relation of the sectors $a$ and $b$ of Fig. 3 whereby successive sectors, as indicated at $a$, $b$, $c$ and $d$, are in overlapping relation at the center. The area in overlapping relation decreases from the hub to the rim as will be understood from Figs. 2, 4, 5 and 6. If the wheel be formed with four plates or sectors in overlapping relation at any line of section at the center, then at a distance from the center, for instance as in Fig. 5, there will be only three of the plates in overlapping relation and at a further distance only two as in Fig. 6, and finally at the rim the plates are practically in edge to edge relationship. In Fig. 3, it will be noted at the point 50, the two disks just overlap at the edge, the purpose being to prevent an interstice or crevice between the disks at this point.

It is to be noted that the sectors are preferably, but not necessarily, formed with one edge straight and the opposite edge curved as will be understood from Fig. 3 and when these plates are assembled in a wheel, one side of the wheel, as shown in Fig. 1, will show the radial straight edge of the plates while on the opposite side of the wheel only the curved edge of the plates will be exposed to view.

By dotted lines 51 I have indicated a wheel of a different diameter in which case the sectors are the same except the dotted line 52 forming the edge of the one sector would be changed slightly but having the same relationship as the corresponding full line of the larger sector a. Correspondingly the wheel may be of greater diameter, the sector simply being increased in length. In any case the various sectors are fan shaped in their final relationship providing several plies at the center, the number of plies in overlapping relation decreasing at successive points toward the periphery or rim. It is evident from this arrangement, a strong and sturdy construction of disk is provided at the hub or center where the greatest strain occurs, and that, at successive points toward the periphery, the strength at any point of cross section is decreased, resulting in a resilient disk. The strength of the wheel as a whole is not materially decreased toward the rim but, due to the arrangement of the plates in the fan shape about a center and the form of the plates, the area of metal in engagement with the rim is greater than the area of any circle of less diameter but greater flexibility exists due to there being a less number of plates in overlapping relation toward the rim.

In Fig. 2 I have shown the disk of substantially concavo-convex form terminating in a reversely bent periphery for attachment to a rim by bolts 12. In some disk wheels such reversely bent portion is unnecessary, as the periphery of the disk may be secured as shown in Fig. 7 between flanges 14 and 15 by means of bolts 16 and to these flanges may be secured a rim member 13 of any desired form in cross section, the one shown in Fig. 7 being of the type used for a solid rubber tire. In Fig. 8 I have shown a single angle member 18 secured to a tire 17 of the car wheel type, the disk at the periphery being secured to the flange 18 by a series of bolts. In either case Fig. 7 or Fig. 8, the disks may be concaved to a greater or less extent depending upon the flexibility desired and the character of service in which the wheel is used. It is thus evident that the shape of the disk is not material to this invention; that it may be shaped to secure a great flexibility without loss of strength as is required in the usual automobile road wheel, or shaped to give a more solid and less resilient structure as in the usual truck wheels having a solid tire, or in the type of wheel used for street and steam railway cars.

From the above it will be observed that the plates should be assembled and secured together as by the rivets 11 and secured to a hub in any approved manner and then should be formed by a die to secure the desired shape of the disk in cross section and, while I have here shown rivets for securing the sectors together, it is to be understood that, if made of steel or the like, they may be secured together by a welding process as for instance by spot welding whereby the plates all act together as a unit without possibility of relative movement of the plates which are fixedly secured together toward the center and fixedly attached to a rim structure. By varying the number of plates in overlapping relation at the center, a wheel for light or heavy duty may be secured, and the flexibility and strength of the wheel will be determined by the number of plates and the shape of the disk in cross section.

I have generally described the disk as being of a single thickness of plate at the rim. It is evident, however, that the plates may extend in considerable overlapping relation at the rim especially where strength of the disk is particularly desired as in a truck wheel or a car wheel and therefore in Figs. 7 and 8 I have shown two thicknesses of plates or sectors at the rim. Where great flexibility is desired, a single thickness is utilized as suggested in Figs. 2 or 3.

Preferably the disk for the majority of uses is made of metal as for instance sheet metal, but it is to be understood that the disk may be formed of plates of any adaptable material as wood, fiber, or various kinds of material and also that, with wheels of small diameter where necessity for great strength does not exist as for instance in hand wheels for various uses, the plates may be secured together at the hub and to the rim only and not one to the other as by riveting or welding as is the preferable method in the manufacture of vehicle road wheels.

From the foregoing description it is evident that the shape and character of the rim of the wheel, or the character of the hub of the wheel or mode of attachment of the disks to the hub or the rim is not material to this invention which relates particularly to the formation of a disk of several sectors arranged to form a circle, a plurality of which are in overlapping relation at the center and extending in fan shape about the hub whereby the area of the sectors in overlapping relation decreases at successive points toward the rim. I thus am able to secure a disk wheel that is of greatest strength toward the center and of ample strength throughout and of increasing flexibility from the center toward the rim where the disk is practically of a single thickness of metal. Further, that by the arrangement described, the various objects of the invention are attained and a wheel that is artistic in appearance is secured.

Having thus fully described my invention, its utility and mode of operation, what I claim and desire to secure by Letters Patent of the United States is—

1. In a disk wheel, the combination with a hub and a rim, of a disk formed of a plurality of sectors in overlapping relation, the area in overlapping relation being of greatest extent at the hub and decreasing toward the rim.

2. In a disk wheel, the combination with a hub and rim of the wheel, of a disk formed of a plurality of sectors of similar thickness and form arranged about the hub in a fan shape providing a disk having the thickness of several sectors at the hub and a less number of sectors at the rim.

3. In a disk wheel, the combination with the hub and a rim, of a disk formed of a plurality of plates forming sectors attached to the hub and to the rim and shaped and arranged to form a disk having the thickness of several plates at the hub and having practically the thickness of one of the plates at the periphery.

4. In a disk wheel, the combination with a hub and the rim, of a disk formed of a plurality of plates of sheet metal forming sectors arranged radially about the hub and attached together and to the hub and to the rim at opposite ends, the composition disk thus formed having the thickness of several plates at the hub and of less thickness at the periphery.

5. In a disk wheel, the combination with a hub and a rim, of a disk formed of a plurality of sectors of like form and thickness secured to the hub in overlapping relation and individually to the rim providing a composite disk of the thickness of several sectors at the center and of the thickness of a single sector at the rim.

6. In a disk wheel, the combination with the hub and rim, of a disk formed of a plurality of sectors in radial relation and lying in overlapping relation at the center, the extent of the overlapping area of the adjacent disks decreasing practically to a vanishing point at the rim, the composite disk being shaped to secure resiliency in the plane of the wheel.

7. In a disk wheel, the combination with a hub and a rim, of a disk formed of a plurality of sectors of similar form secured together and secured to the hub and the rim at opposite ends, the said sectors being so shaped and arranged to lie successively in overlapping relation at the hub whereby the disk at the hub has a thickness of a number of sectors, the area in overlapping relationship decreasing toward the rim where the thickness of the disk is practically that of a single sector.

8. A vehicle wheel comprising a hub and a rim, a plurality of plates providing sectors duplicate in form attached to the hub and to the rim, the sectors lying in overlapping relation at the center and being secured one to the other between the ends, the area of adjacent sectors in overlapping relation decreasing from the hub toward the rim.

9. A vehicle wheel comprising a hub and a rim and a plurality of sheet metal plates providing sectors practically duplicate in form each secured at the respective ends to the hub and rib, adjacent sectors being secured together intermediate the ends, and the assembled sectors providing a disk concavo-convex in form terminating in a reversely turned peripheral portion to which the rim is secured.

10. A vehicle wheel comprising a hub and a rim, a disk formed of a plurality of plates providing sectors of duplicate form attached to the hub and to the rim, the plates lying successively in overlapping relation at the center, the area in overlapping relation decreasing from the hub toward the rim, and a flange secured to the periphery of the disk providing a seat for the rim.

11. In a vehicle wheel, a hub and a rim, a disk formed of a plurality of plates of substantially triangular shape attached to the hub and circularly arranged thereabout in fan shape, and rim receiving members attached to the periphery of the disk thus formed.

12. In a vehicle wheel, a hub and a rim, a disk formed of a plurality of sector like plates secured in overlapping relation to the hub being arranged in fan shape thereabout, a pair of rim receiving members attached to opposite sides of the periphery of the disk consisting of circular members of angular shape in cross section together providing a substantially flat cylindrical surface on which the rim is mounted.

In testimony whereof I sign this specification.

JOHN F. WILMOT.